United States Patent
Krueger

[11] Patent Number: 6,103,050
[45] Date of Patent: Aug. 15, 2000

[54] METHOD OF LASER SLITTING AND SEALING TWO FILMS

[75] Inventor: Duane A. Krueger, Winneconne, Wis.

[73] Assignee: American National Can Company, Chicago, Ill.

[21] Appl. No.: 09/131,574

[22] Filed: Aug. 10, 1998

[51] Int. Cl.[7] .................................................. B32B 31/00
[52] U.S. Cl. ...................................... 156/251; 156/272.8
[58] Field of Search .................................. 156/251, 269, 156/271, 272.2, 272.8, 275.1, 380.9, 515; 219/121.63, 121.64, 121.67, 121.72, 121.85; 493/199; 383/109, 113, 116

[56] References Cited

U.S. PATENT DOCUMENTS

| | | |
|---|---|---|
| 4,414,051 | 11/1983 | Bose . |
| 4,490,203 | 12/1984 | Bose . |
| 5,314,767 | 5/1994 | Bussard . |
| 5,455,129 | 10/1995 | Bussard . |
| 5,500,503 | 3/1996 | Pernicka et al. . |
| 5,502,292 | 3/1996 | Pernicka et al. . |
| 5,630,308 | 5/1997 | Guckenberger . |
| 5,804,020 | 9/1998 | Akao et al. ............................ 156/251 |

*Primary Examiner*—Michael W. Ball
*Assistant Examiner*—Michael A Tolin
*Attorney, Agent, or Firm*—McDermott, Will & Emery

[57] ABSTRACT

A method for slitting and sealing a lamination having a polyethylene layer and a coextruded film having a nylon™ layer. The improvement comprises slitting and sealing the two films with a laser generated light beam. The films are co-wound such that the coextruded film is closest to the laser. The laser slits the coextruded film first and thereafter the lamination. The polyethylene side of the lamination is positioned closest to the laser and is slit prior to other layers of the lamination. The method allows the polyethylene more time to absorb the energy from the laser and takes advantage of the efficient energy absorbing characteristics of the nylon™ in the coextruded film, resulting in improved slitting and sealing rates.

7 Claims, 2 Drawing Sheets

METHOD OF LASER SLITTING AND SEALING TWO FILMS

FIELD OF THE INVENTION

The invention relates to a method of slitting and sealing two films together using a laser. More particularly, it relates to an improved method of slitting and sealing two films together at a faster rate by maximizing energy transfer between the films.

BACKGROUND OF THE INVENTION

A common method practiced by the inventor for slitting and sealing two plastic films involves using heated knives to slit the films and thereafter seal the edges of the films together. Typically, the films used are a blown coextruded film and a lamination. Coextruded films are useful because multiple materials, having desirable properties, can be combined into one film. Similarly, laminations provide a method of combining dissimilar materials into one composite that cannot be combined by other methods such as coextrusion. The lamination typically comprises a nylon layer and a polyethylene layer, with a metallized polyester layer therebetween. The lamination and the coextruded film are fed from independent unwind rolls to a grooved mandrel, one film being layered and co-wound over the other. The conventional method practiced has been to layer the lamination closest to the heated knives, with the nylon layer of the lamination being positioned closest to the knives. The lamination engages the heated knives first because the melting point of the nylon and polyester is high enough to prevent sticking and subsequent polymer buildup on the knives. The heated knives slice into the mandrel grooves, engaging the lamination first, and thereafter slitting the lamination and the coextruded film. The heat energy from the knives fuses the two films together at the slit edges thereby forming a composite.

The rate at which the films are slit and sealed depends in significant part on the energy absorbing capability of the film materials. Using the above-described method achieves slitting and sealing rates of 50 feet of composite per minute. Generally, films that absorb energy efficiently will fuse and seal more readily. Accordingly, any method that maximizes energy transfer and facilitates the fusing process will improve the slitting and sealing rate.

There are also known in the art methods for slitting and sealing two or more materials using light beams from a laser instead of heated knives. Because light beams generated by lasers are more precise energy transfer devices than heated knives, laser-based methods typically result in cleaner seals where fusing is involved. One example of a laser slitting and sealing method is found in U.S. Pat. Nos. 4,414,051 and 4,490,203 to Bose, disclosing a method whereby a laser beam slits and seals an extrusion blown tube into two or more tubes. The Bose patents focus on reduced bead formation at slit/seal points and improved seal strength. Other laser slitting and sealing methods include: U.S. Pat. No. 5,630,308 to Guckenberger, disclosing a method of laser scoring packaging substrates to form an easy opening tear control package such as a pouch; U.S. Pat. Nos. 5,502,292 and 5,500,503 to Pernicka, et al., disclosing a method of simultaneously cutting and welding ultra thin metallic foil materials using a pulsed laser; and U.S. Pat. Nos. 5,314,767 and 5,455,129 to Bussard, disclosing a holographic product having sealed edges. In Bussard, a plastic top layer of the holographic product can be simultaneously cut and sealed with a variety of cutting tools including a laser.

While the prior art discloses methods for cutting and sealing materials using heated knives and lasers, it does not provide a method that focuses on a technique to improve slitting and sealing rates. Improved slitting and sealing rates result in higher composite output and reduced production costs. Accordingly, there is a need in the art for a more efficient slitting and sealing method that improves slitting and sealing rates.

SUMMARY OF THE INVENTION

The method of the present invention achieves substantial improvement in slitting and sealing rates by maximizing energy transfer between two films. Particularly, it is an object of the invention to provide a method of slitting and sealing multiple films by co-winding a coextruded film and a lamination, applying an energy transfer device first to said coextruded film and second to said lamination, and slitting and sealing edges of said coextruded film and said lamination with said energy transfer device.

It is a further object of the invention to provide a lamination comprised of layered biaxially oriented nylon, metallized-polyester and linear low density polyethylene.

It is still another object of the invention to provide a method of slitting and sealing where an energy transfer device is applied first to the linear low density polyethylene layer of said lamination, second to the metallized-polyester layer of said lamination and third to the biaxially oriented nylon layer of said lamination.

Yet another object of the invention is to provide a coextruded film comprised of linear low density polyethylene, a first tie layer, nylon 6, a second tie layer and linear low density polyethylene.

BRIEF DESCRIPTION OF THE DRAWINGS

The objects of the invention may be more clearly understood from the following detailed description and by reference to the drawings in which.

DETAILED DESCRIPTION

Figure 1:
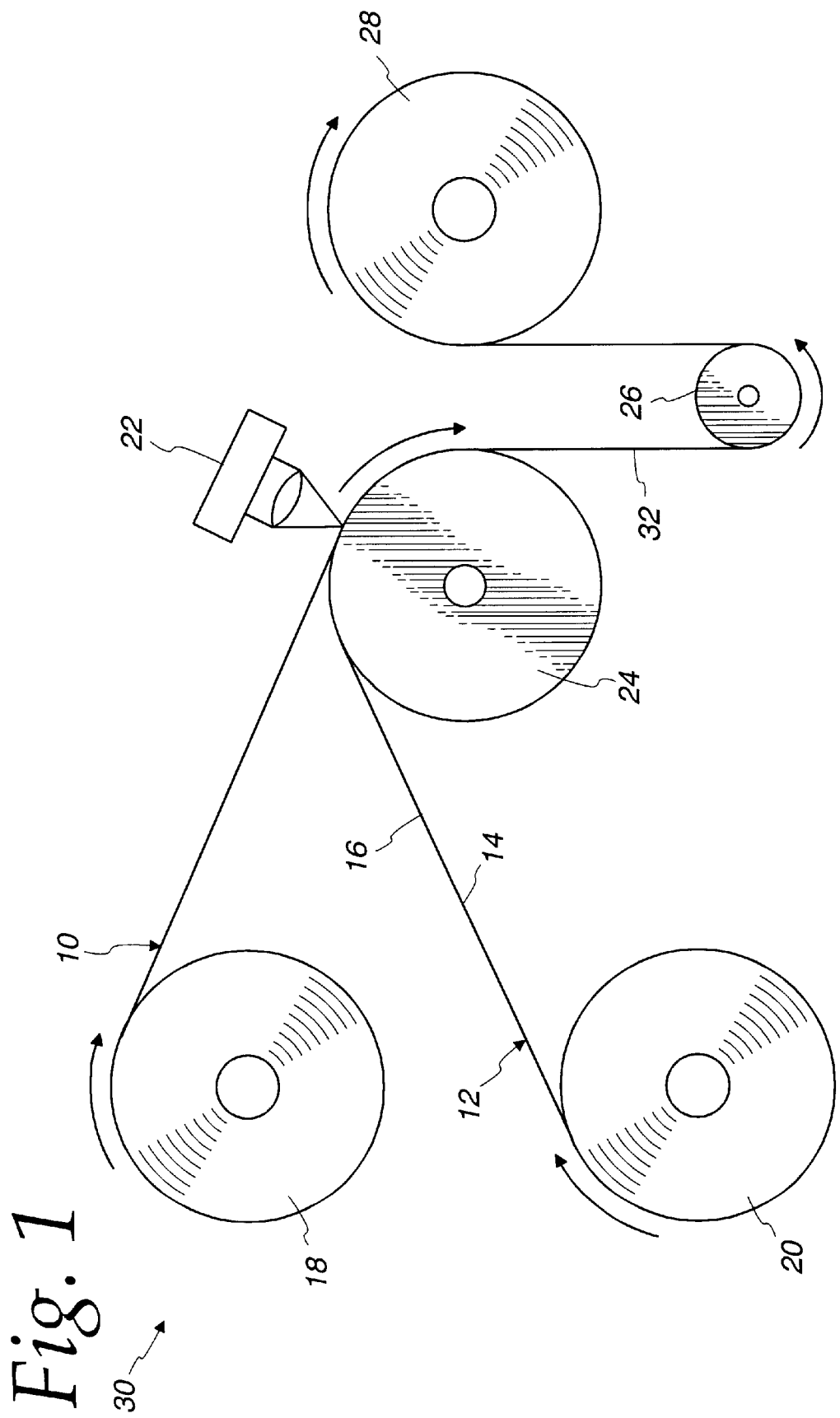
FIG. 1 is an illustration of an apparatus for carrying out the method of the present invention having a first unwind roll carrying coextruded film, a second unwind roll carrying a lamination, a laser, a mandrel, a transfer roll and a windup roll.

Referring to FIG. 1, there is illustrated an apparatus 30 for carrying out the method of the present invention and for producing a two film composite 32. The composite 32 is useful for containing chemically aggressive materials which readily permeate polyolefin films such as polyethylene and polypropylene. Such chemicals include, but are not limited to, surfactants, alcohols and other organic chemicals. The apparatus 30 preferably includes a first unwind roll 18 and a second unwind roll 20. Unwind roll 18 carries a coextruded film 10. Unwind roll 20 carries a lamination 12.

Figure 2:
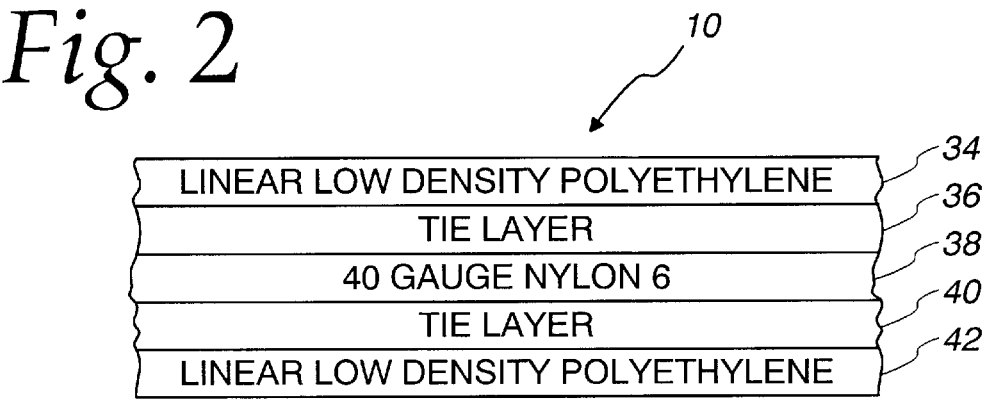
FIG. 2 is an illustration of the structural configuration of the coextruded film according to the present invention.
Figure 4:
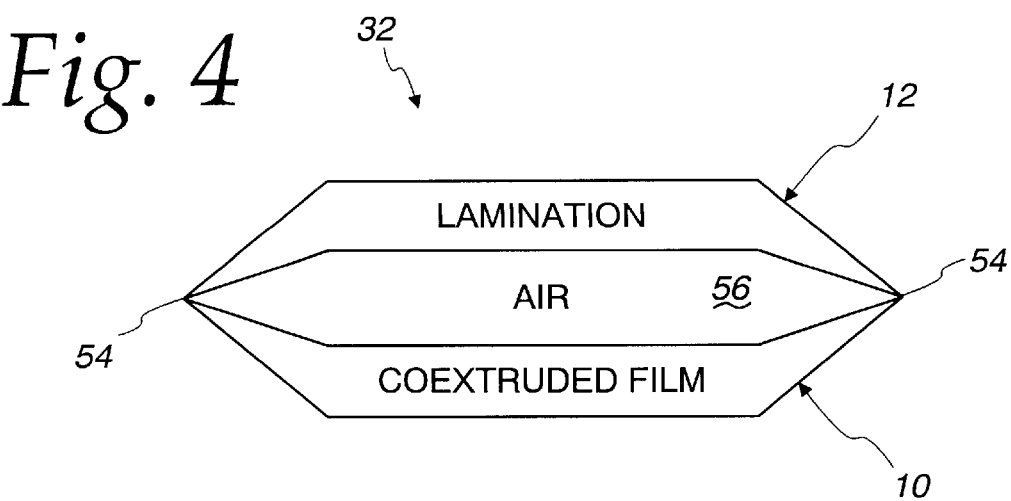
FIG. 4 is an illustration of the structural configuration of the finished composite according to the present invention.

FIG. 2 is an illustration of the structural configuration of the coextruded film 10, which comprises the following layers: a first layer of linear low density polyethylene 34, a first tie layer 36, a layer of 40 gauge nylon 6 38, a second tie layer 40 and a second layer of linear low density polyethylene 42. The coextruded film 10 improves the overall strength of the composite 32 (FIG. 4). The tie layers 36 and 40 are chemically modified polyolefins. In the preferred embodiment, the tie layers 36 and 40 comprise polyethylene modified with acid anhydride. This modification improves adhesion of the nylon 6 38 with the two layers of polyethylene 34 and 42.

Figure 3:
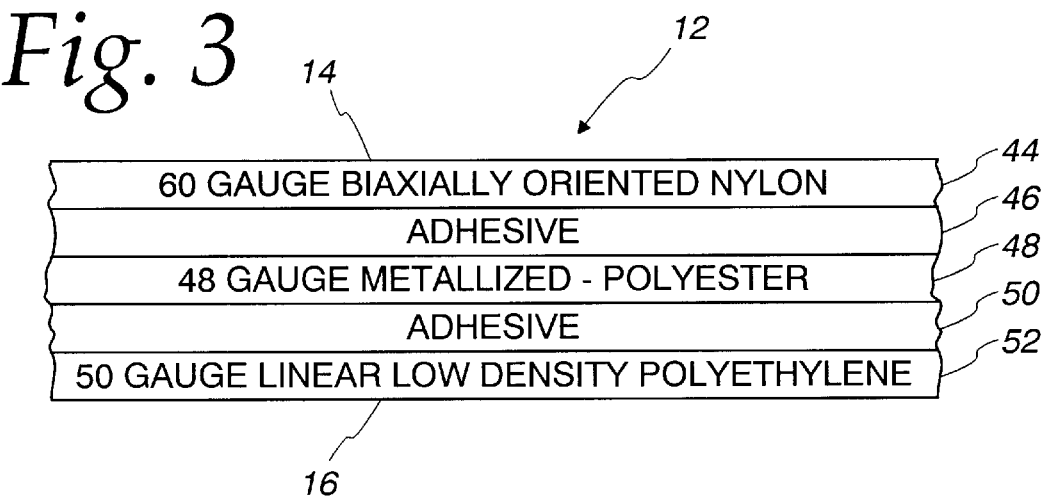
FIG. 3 is an illustration of the structural configuration of the lamination according to the present invention.

FIG. 3 is an illustration of the structural configuration of the lamination 12 comprising the following layers: a layer of 60 gauge biaxially oriented nylon™ 44, a first adhesive layer 46, a 48 gauge metallized polyester layer 48, a second adhesive layer 50 and a 50 gauge linear low density polyethylene layer 52. The biaxially oriented nylon 44 is used as an outer layer to provide heat resistance in the event that the composite 32 (FIG. 4) itself is subjected to future heat sealing processes. The nylon 44 is oriented and heat set at very high temperatures, providing better stability and a higher melting point. The biaxially oriented nylon 44 also has desirable durability and flex crack resistance characteristics. Oriented polypropylene could also be used as an outside layer because it also has desirable flex crack resistance characteristics. However, nylon has better heat resistance than polypropylene. The adhesive layers 46 and 50 are comprised of polyester urethane. The middle layer, 48 gauge metallized polyester 48, has desirable gas and moisture barrier properties. Examples of other materials with desirable barrier properties include nylon, EVOH and Saran™. The 50 gauge linear low density polyethylene layer 52 is used to facilitate the attachment of the lamination 12 to the polyethylene 34 and 42 in the coextruded film 10 (FIG. 2).

Referring to FIG. 1, the coextruded film 10 and the lamination 12 are co-wound at mandrel 24 such that the coextruded film 10 is nearest to laser 22. In the preferred embodiment, the laser 22 is a sealed carbon dioxide laser made by the Industrial Laser Source of Hopedale, Mass. During the slitting and sealing process, the laser 22 cuts first through the coextruded film 10 and then through the lamination 12. As the laser 22 slits the two films, the films melt and fuse together at the slit edges 54 (FIG. 4).

Referring to FIGS. 1 and 2, the 40 gauge nylon 6 38 of the coextruded film 10 readily absorbs the energy from the laser 22 and, as a result, assists in the melting and fusing of all layers of the coextruded film 10 and the lamination 10.

Referring to FIGS. 1 and 3, the laser 22 engages and slits the 50 gauge linear low density polyethylene 52, or the polyethylene side 16, prior to slitting the 60 gauge biaxially oriented nylon 44, or the nylon side 14, of the lamination 12. Upon completion of the slitting and sealing process, the newly formed composite 32 is transferred from transfer roll 26 to windup roll 28, whereupon the composite 32 may be distributed to an end user.

As can be seen from the test results in the table below, slitting and sealing rates of up to 400 feet of composite per minute, as opposed to 50 feet per minute using conventional methods, are achieved when laser slitting is performed on the polyethylene side 16 of the lamination 12 and where the coextruded film 10 is engaged and slit by the laser 22 prior to the lamination 12.

| Side | Speed (Feet Per Minute) |
|---|---|
| Nylon | 290 |
| Nylon | 290 |
| Nylon | 270 |
| Nylon | 200 |
| Polyethylene | 250 |
| Polyethylene | 300 |
| Polyethylene | 400 |

Applying the laser on the polyethylene side 16 of the lamination 12 allows more time for the polyethylene 52 to absorb the energy of the laser 22 than in the conventional practice of slitting on the nylon side 14. The polyethylene 52 absorbs energy from the laser less efficiently than either the nylon 44 or the polyester 48 in the lamination 12. Providing more time for absorption results in the polyethylene 52 reaching its melting point sooner, enhancing the fusing rate between the layers of the coextruded film 10 and the lamination 12. The improved slitting and sealing rates achieved by the method of the present invention are also due in part to the efficient energy absorption characteristics of the 40 gauge nylon 6 38 (FIG. 2) in the coextruded film 10. The 40 gauge nylon 6 38 aids in the melting and fusing of all layers in the coextruded film 10 and the lamination 12. Also, positioning of the 48 gauge metallized polyester 48 is also critical because metallized components tend to reflect, rather than absorb, the light beam of the laser 22. Accordingly, engaging the coextruded film first with the laser 22 prior to the lamination 12 positions the 48 gauge metallized polyester 48 further from the laser 22. This minimizes the reflective effect of the metallized polyester 48 and promotes melting of every layer of the coextruded film 10 and the lamination 12.

FIG. 4 is an illustration of the structural configuration of the finished composite 32. The composite 32 as shown comprises the lamination 12, an air layer 56 and the coextruded film 10, with the lamination 12 and the coextruded film 10 being sealed at their respective edges 54.

In operation, a coextruded film and a lamination are co-wound and slit such that the coextruded film has initial contact with a laser generated light beam. The energy from the laser slits and seals the various layers of the lamination and the coextruded film. The 40 gauge nylon 6 in the coextruded film readily absorbs the energy from the laser and facilitates the transfer of energy to the less efficient energy absorbing layers of the coextruded film and the lamination. The polyethylene side of the lamination is engaged and slit by the laser prior to the nylon side of the lamination. This gives the polyethylene more time to absorb the light beam energy of the laser. The resulting composite is sealed at the slit edges with an air layer in between.

The invention and its attendant advantages will be understood from the foregoing description and it will be apparent that various changes may be made in the form and method of making, and the construction and arrangement of the parts without departing from the spirit and scope thereof or sacrificing its natural advantages, the arrangements hereinbefore described being merely by way of example.

I claim:

1. A method of slitting and sealing two films comprising the steps of:

bringing a coextruded film and a laminated film together on a roll; and slitting and sealing said coextruded film and said laminated film with an energy transfer device, said energy transfer device being applied first to said coextruded film and second to said laminated film.

2. The method of claim 1 wherein said laminated film is comprised of layered biaxially oriented nylon, a first adhesive, metallized-polyester, a second adhesive and linear low density polyethylene.

3. The method of claim 2, wherein said energy transfer device is applied first to said polyethylene, second to said metallized-polyester and third to said biaxially oriented nylon of said laminated film.

4. The method of claim 2, wherein at least one of said first and second adhesives is comprised of polyester urethane.

5. The method of claim 1, wherein said coextruded film is comprised of linear low density polyethylene, a first tie layer, nylon 6, a second tie layer and linear low density polyethylene.

6. The method of claim 5, wherein at least one of said first and second tie layers is comprised of a polyethylene modified with acid anhydride.

7. The method of claim 1, wherein said energy transfer device is a laser.

* * * * *